United States Patent [19]
Cook

[11] 3,859,636
[45] Jan. 7, 1975

[54] MICROPROGRAM CONTROLLED DATA PROCESSOR FOR EXECUTING MICROPROGRAM INSTRUCTIONS FROM MICROPROGRAM MEMORY OR MAIN MEMORY

[75] Inventor: Robert Wilcox Cook, Naperville, Ill.

[73] Assignee: Bell Telephone Laboratories, Incorporated, Murray Hill, N.J.

[22] Filed: Mar. 22, 1973

[21] Appl. No.: 343,656

[52] U.S. Cl. .......... 340/172.5
[51] Int. Cl. .......... G06f 9/16
[58] Field of Search .......... 340/172.5

[56] References Cited

UNITED STATES PATENTS

| | | | |
|---|---|---|---|
| 3,541,518 | 11/1970 | Bell et al. | 340/172.5 |
| 3,579,192 | 5/1971 | Rasche et al. | 340/172.5 |
| 3,634,883 | 1/1972 | Kreidermacher | 340/172.5 |
| 3,675,214 | 7/1972 | Ellis et al. | 340/172.5 |
| 3,696,340 | 10/1972 | Matsushita et al. | 340/172.5 |
| 3,725,868 | 4/1973 | Malmer, Jr. et al. | 340/172.5 |
| 3,739,352 | 6/1973 | Packard | 340/172.5 |
| 3,748,649 | 7/1973 | McEowen et al. | 340/172.5 |

*Primary Examiner*—Harvey E. Springborn
*Attorney, Agent, or Firm*—J. C. Albrecht

[57] ABSTRACT

A microprogram controlled data processor for executing microprogram instructions from the microprogram memory or from the main memory having a control unit, a random access readable and writable main memory containing main program sequences and data, and a random access read-only microprogram memory containing microprogram sequences and fixed data. Control circuitry is provided in the control unit for directly executing instructions which are coded in microprogram instruction code format and stored in the main memory. The control circuitry includes a flip-flop which is selectively set and reset by the execution of corresponding microprogram instructions. The states of the flip-flop determine the source of subsequent microprogram instructions as being the microprogram memory or the main program memory, respectively.

4 Claims, 2 Drawing Figures

Patented Jan. 7, 1975

3,859,636

2 Sheets-Sheet 1

MICROPROGRAM CONTROLLED DATA PROCESSOR FOR EXECUTING MICROPROGRAM INSTRUCTIONS FROM MICROPROGRAM MEMORY OR MAIN MEMORY

BACKGROUND OF THE INVENTION

This invention relates to microprogram controlled data processors.

A microprogram controlled data processor may be defined as a machine wherein a programmer specifies data processing actions by instructions in a first coded form termed main program instructions; and each main program instruction serves to access a sequence of instructions in a second coded form termed "microprogram instructions" which, when executed in sequence, serve to implement the data processing action specified by the corresponding main program instruction. Microprogram controlled processors typically comprise: a relatively slow speed readable and writable random access main memory containing main program sequences and data; a main memory register; a plurality of internal registers for storing data; a relatively high speed read-only random access microprogram memory containing microprogram sequences and fixed data; a microprogram instruction register; and a microprogram decoder which decodes the contents of the microprogram instruction register and in combination with timing signals generates processor control signals for accomplishing the specified data manipulation. Since the microprogram sequences serve to interpret standard format main program instructions, the information in the microprogram memory is infrequently changed. Accordingly, a read-only random access memory may be utilized as a microprogram memory. Such a read-only memory is relatively inexpensive when compared to a correspondingly high speed readable and writable random access memory.

The above-described typical microprogram controlled processor elements serve well the execution of day-to-day operating and computational program sequences written in main program instruction code, however, the debugging of new microprogram sequences and the execution of relatively long maintenance program sequences create major problems which have heretofore been solved only by the provision of a readable and writable microprogram memory or, in the case of maintenance programs, by the use of a very large read-only memory which has sufficient capacity to store the seldom used maintenance program sequences. Both of these priorly known solutions create an extreme economic hardship.

SUMMARY OF THE INVENTION

In accordance with the present invention, a microprogram controlled data processor comprises circuitry for directly executing instructions which are coded in microprogram instruction code format and stored in the main memory.

DESCRIPTION OF THE DRAWING

This invention will be understood from the following description of the illustrative embodiment when read with respect to the drawing in which.

DETAILED DESCRIPTION

Figure 1:
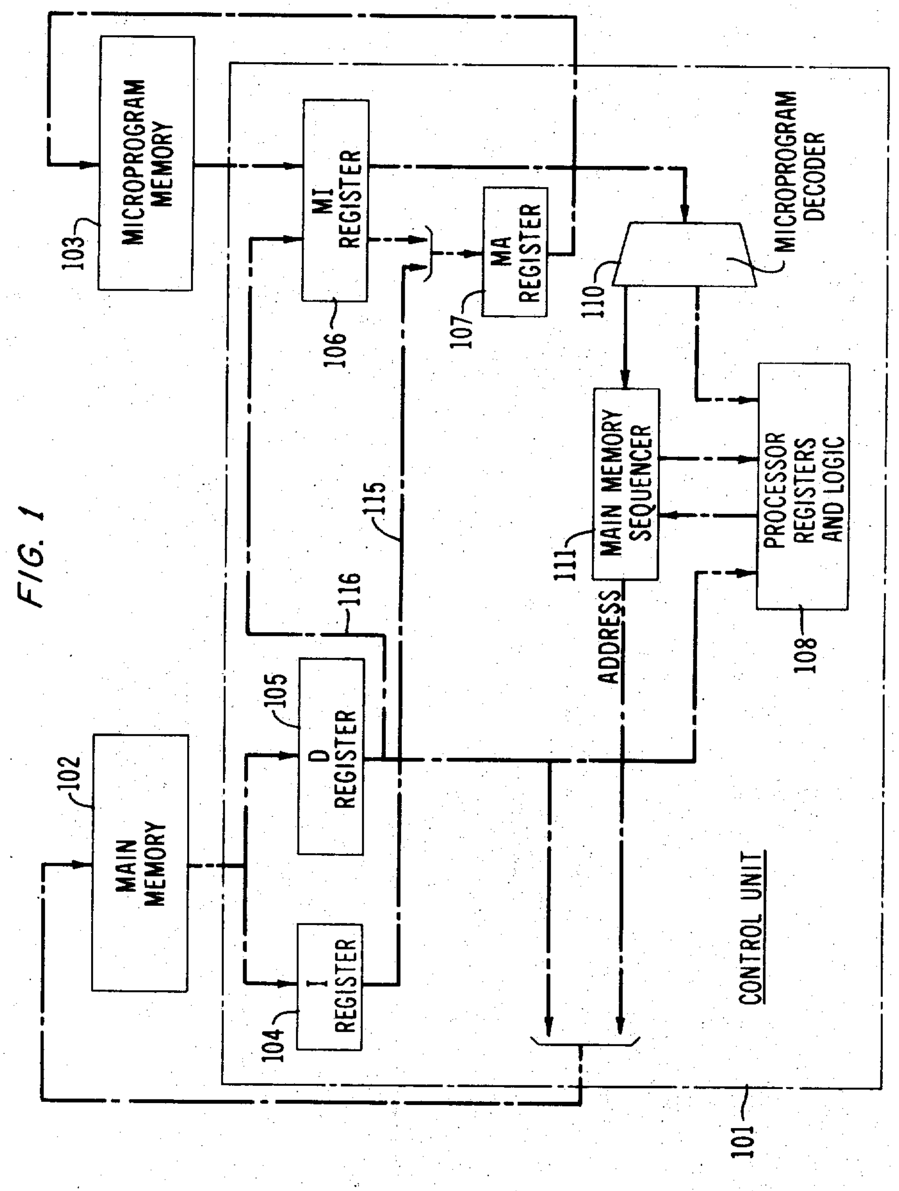
FIG. 1 is a block diagram of a microprogram controlled data processor in accordance with the present invention.

The ilustrative processor of FIG. 1, except for the data transfer path 116 and certain control functions which are not illustrated in FIG. 1, represents a priorly known microprogram controlled data processor. The principal components of the illustrative prior art processor are:

a. the relatively slow speed readable and writable random access main memory 102;

b. the random access read-only microprogram memory 103; and c. the control unit 101.

The control unit 101 is arranged to fetch main program instructions in sequence from the main memory 102 and in accordance with the operation codes of those instructions to fetch, in sequence, the corresponding microprogram instruction words from the microprogram memory 103. In addition, the control unit 101 is arranged to transfer data obtained from the main memory 102 to the processor registers and logic 108 and to generate control signals for utilization by the processor registers and logic 108.

Information is read from the main memory 102 under the control of the main memory sequencer 111. The main memory sequencer 111 controls the accessing of the main memory 102. A sequencer such as is contemplated here is known, for example, see Paul Siegel, Understanding Digital Computers, John Wiley and Sons, Inc., 1961, Pages 366 through 369. Siegel teaches the design of a control unit for a specimen computer including memory control. Also, Donald Eadie, Introduction to the Basic Computer, Prentice-Hall, 1968, Pages 336 through 340, teaches the design of the control subsection, including memory control, of a specimen computer; and Hans W. Gschwind, Design of Digital Computers, Springer-Verlag, New York, 1967, Pages 274 through 294, which teaches the design of memory control sequential circuits. The design of sequencers in general is also described in Gschwind at Pages 274 through 282. Main program instructions and data obtained from the main memory 102 are stored in the instruction (I) register 104, and the data (D) register 105, respectively. A main program instruction comprises an operation code which defines the address in the microprogram memory 103 at which the first microprogram instruction word of a corresponding sequence of microprogram instruction words is to be found. Accordingly, the contents of the I register 104 are gated at an appropriate time to the MA register 107 which is the address register for accessing the microprogram memory 103. The words stored in the microprogram memory 103 each comprise an instruction portion and a next microprogram instruction word address portion. The words obtained from the microprogram memory 103 are stored in the microprogram instruction (MI) register 106. The next microprogram instruction word address portion of a microprogram memory word stored in the MI register 106 is gated at the appropriate time to the MA register 107 to fetch the next microprogram instruction word of the sequence from the microprogram memory 103. The instruction portion of a microprogram memory word stored in the MI register 106 is decoded by the microprogram decoder 110 which generates control signals for performing the desired data processing actions. The design of decoders of the type contemplated is well known. See, for example, Ivan Flores, Computer Design, Prentice-Hall, Pages 248 through 250. The last microprogram instruction word of a sequence, when executed, causes the processor to fetch the next main program instruction from the main memory 102.

Figure 2:
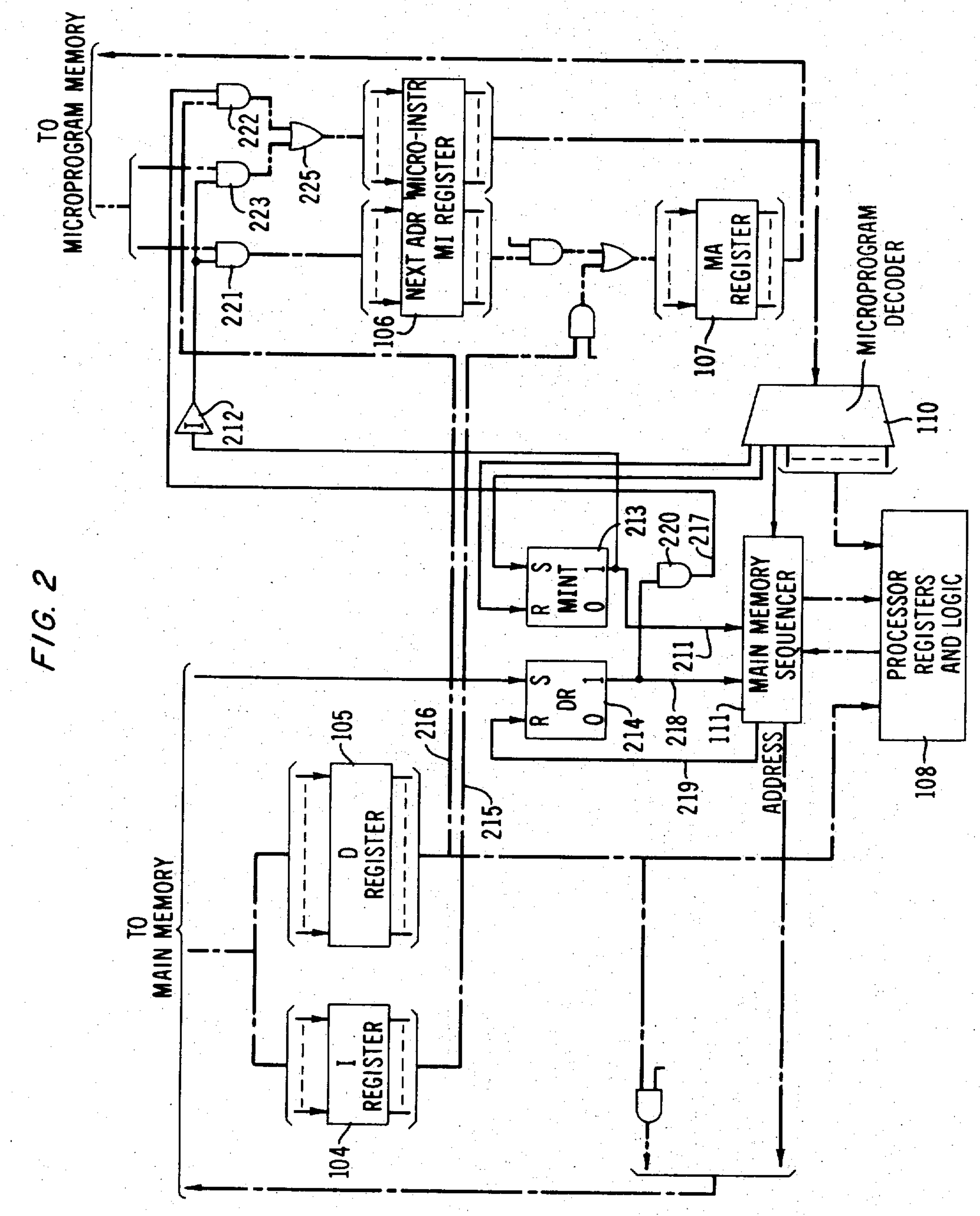
FIG. 2 is a more detailed showing of the control unit of the processor of FIG. 1.

In accordance with the illustrative embodiment of the present invention, one of the set of main program instructions is termed a "microinterpret mode instruction". With reference to the control unit of FIG. 2, the instruction portion of the microprogram instruction word which is stored at the microprogram memory address defined by the "microinterpret" instruction serves to place the processor in a mode of operation termed the microinterpret mode by setting the MINT flip-flop 213 to the 1 state. The MINT flip-flop 213 is utilized to transfer program control of the processor between microprogram instructions stored in the microprogram memory 103 and microprogram instructions stored in the main memory 102. Program control is transferred to microprogram instructions stored in the main memory 102 by execution of the instruction portion of a microprogram instruction word retrieved from the microprogram memory 103, which, when decoded by the microprogram decoder 110 serves to set the MINT flip-flop 213 to its 1 state. The processor is taken out of the microinterpret mode and program control is returned to microprogram instructions stored in the microprogram memory 103 by execution of a microprogram instruction stored in the main memory 102 which, when decoded by the microprogram decoder 110, serves to reset the MINT flip-flop 213 to its 0 state.

Assuming that the processor has been placed in the microinterpret mode of operation wherein program control is transferred to the microprogram instructions stored in the main memory 102, a sequence of microprogram instructions stored in the main memory 102 may be executed without dependence on the fetching of microprogram instruction words from the microprogram memory 103. These microprogram instructions are executed at the rate at which the main memory 102 can be readdressed under control of the main memory sequencer 111. When a microprogram instruction has been obtained from the main memeory 102 the DR flip-flop 214, which serves to indicate when information has been obtained from the main memory 102, is set to its 1 state. The DR flip-flop 214 is subsequently reset to its 0 state by an output signal generated by the main memory sequencer 111 on conductor 219. The states of the DR flip-flop 214 and the MINT flip-flop 213 are utilized in the main memory sequencer 111 to advance to the next instruction in the program sequence. The states of these flip-flops are transmitted to the main memory sequencer 111 over the conductors 218 and 211, respectively. Additionally, the signals on these conductors are combined in the AND gate 220 to control the gating of microprogram instructions to the MI register 106. When the MINT flip-flop 213 is in the 1 state and the DR flip-flop is in the 1 state (indicating that the processor is in the microinterpret mode and that a new microprogram instruction has been read from the main memory 102) the AND gate 220 will be enabled, and, in turn, the AND gate 222 will be enabled. This set of conditions serves to transmit the contents of the D register 105 over conductor group 216 and gate 222 to the instruction code portion of the MI register 106. When the MINT flip-flop is in the 0 state (indicating the processor is not in the microinterpret mode of operation) the AND gate 220 will not be enabled and an enabling signal will appear at the output of the inverter 212. Accordingly, the AND gates 221 and 223 will be enabled to provide a path between the microprogram memory 103 and both portions of the MI register 106.

In summary, the processor may be placed in the microinterpret mode of operation by the execution of the instruction portion of a microprogram instruction word obtained from the microprogram memory 103 which serves to set the MINT flip-flop 213 to its 1 state. This flip-flop is restored to its 0 state by execution of a last microprogram instruction obtained from the main memory 102 during the time the processor is in the microinterpret mode of operation. During the periods of time that the processor is in the microinterpret mode of operation, microprogram instructions are obtained in sequence from the main memory 102 and after the last microprogram instruction of a sequence obtained from the main memory 102 is interpreted, subsequent processing is under the control of microprogram instruction words obtained from the microprogram memory 103.

It is to be understood that the above described arrangement is merely illustrative of the application of the principles of the invention. Numerous other arrangements may be derived by those skilled in the art without departing from the spirit and scope of the invention.

What is claimed is:

1. A microprogram controlled data processor wherein execution of one microprogram instruction can determine the state of the processor for execution of subsequent instructions comprising:

a random access readable and writable main memory;

a random access and read-only microprogram memory; and a control unit comprising:

means for obtaining memory words comprising main memory instructions, data or microprogram instructions from said main memory or for writing such memory words into said main memory;

memory register means for storing at least a portion of each of the memory words obtained from said main memory;

a microprogram instruction register;

decoding means connected to said microprogram instruction register and responsive to the contents thereof for generating processor control signals;

means comprising a microprogram memory address register and first gating means for selectively transferring microprogram instructions from said microprogram memory to said microprogram instruction register;

second gating means for transferring microprogram instructions from said memory register means to said microprogram instruction register; and a first flip-flop responsive to certain of said processor control signals generated during execution of microprogram instructions for selectively enabling or disabling respective ones of said first and second gating means during execution of subsequent microprogram instructions.

2. A microprogram controlled data processor in accordance with claim 8 wherein:

each of said microprogram memory words comprises an instruction portion and a next address portion; and said microprogram instruction register comprises an instruction portion and a next address portion for storing the respective corresponding portions of said microprogram memory words.

3. A microprogram controlled data processor in accordance with claim 1 wherein:

said control unit further comprises means responsive to each memory word obtained from said main memory for indicating the presence or absence of information in said memory register means and for enabling or disabling said second gating means during execution of said subsequent microprogram instructions.

4. A microprogram controlled data processor in accordance with claim 3 wherein:

said means for indicating the presence of information in said memory register means and for controlling said second gating means comprises a second flip-flop; and said second gating means is responsive to the combined states of said first and said second flip-flops.

* * * * *

UNITED STATES PATENT OFFICE
CERTIFICATE OF CORRECTION

PATENT NO. : 3,859,636
DATED : January 7, 1975
INVENTOR(S) : Robert W. Cook

It is certified that error appears in the above-identified patent and that said Letters Patent are hereby corrected as shown below:

Column 5, line 2, "8" should read --1--.

Signed and sealed this 10th day of June 1975.

(SEAL)
Attest:

RUTH C. MASON
Attesting Officer

C. MARSHALL DANN
Commissioner of Patents
and Trademarks